Aug. 26, 1924.

N. D. STURGES

BATTERY

Filed Dec. 15, 1922

1,506,392

INVENTOR
Norman Dexter Sturges
BY
Pennie, Davis, Marvin & Edmonds
his ATTORNEYS

Patented Aug. 26, 1924.

1,506,392

UNITED STATES PATENT OFFICE.

NORMAN DEXTER STURGES, OF BELLEROSE, NEW YORK.

BATTERY.

Application filed December 15, 1922. Serial No. 607,039.

*To all whom it may concern:*

Be it known that I, NORMAN DEXTER STURGES, a citizen of the United States, residing at Bellerose, in the county of Nassau, State of New York, have invented certain new and useful Improvements in Batteries; and I do hereby declare the following to be a full, clear, and exact description of the invention, such as will enable others skilled in the art to which it appertains to make and use the same.

This invention relates to storage batteries, and particularly to improvements therein whereby the plates are insulated without employing separators.

Storage batteries are commonly provided with separators of wood or hard rubber which are interposed between each pair of elements to prevent contact between the elements and consequent short-circuiting of the battery. These separators deteriorate rapidly, particularly when made of wood, and are often broken when the battery is disassembled for inspection or repair. The separators very materially increase the internal resistance of the battery, and when wood separators are employed the electrolyte is frequently contaminated by the soluble constituents of the wood. Wood separators are particularly undesirable when used with jelly electrolytes probably because the soluble organic substances in the wood, which are dissolved by the electrolyte, are not disseminated so readily as in liquid electrolytes.

It is the object of the present invention to avoid the use of separators by employing insulating strips of celluloid or other equivalent acid-resistant insulating material, and in the present instance the strips consist of material which is readily available in the market in continuous lengths which may be cut to any desired size without waste and applied to the battery elements as hereinafter described. Besides avoiding the disadvantages of separators, the strips have the advantage of facilitating the manufacture of battery elements and the assemblage thereof in the battery. The expensive separators are eliminated and the cost of production of batteries is reduced while the life of a battery embodying the invention is materially prolonged.

Further objects and advantages of the invention will be apparent as it is better understood by reference to the following specification and accompanying drawing, in which—

Figure 1:
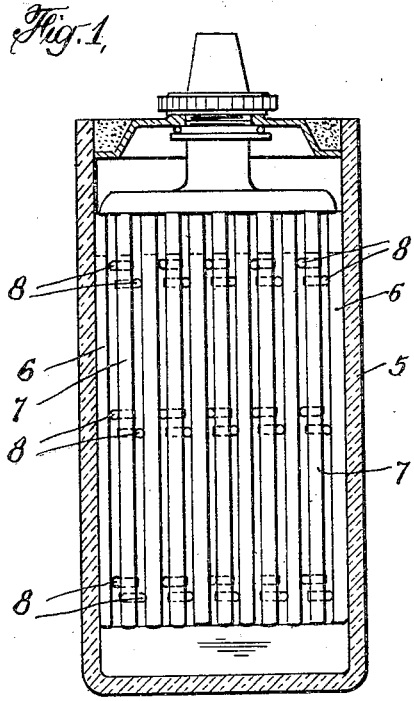
Fig. 1 is a view, partially in section, of a storage battery embodying the invention.

In carrying out the invention I prefer to employ celluloid which is available in the market in the form of "beading." This material is produced in continuous lengths and is ordinarily circular in section although it may have a square or other section so far as its application to the present invention is concerned. A circular section is preferred because the amount of surface contact between the battery element and the strip is thereby reduced. Celluloid is preferred owing to its resistance to acids and its flexibility and elasticity which facilitate application of the strips to the battery elements. Celluloid beading of round section having a diameter of one-sixteenth to one-eighth inch is best adapted to the accomplishment of the purpose of the invention although the diameter may vary depending upon the desired degree of separation of the battery elements.

The strips are preferably applied to the positive elements or plates for the reason that this arrangement permits assemblage of the battery elements in a jar of normal size in which there are usually an even number of positive plates and an odd number of negative plates. The strips may be applied to the negative elements or to both the negative and positive elements, but in this case it would be necessary to modify the size of the battery jar. It is obviously preferable to utilize battery jars of standard dimensions and to apply the strips in such a manner that the usual number of elements carrying the insulating strips may be assembled therein.

Otherwise than in the substitution of the insulating strips for the separators the battery may be substantially identical in its structural features with ordinary storage batteries. It may consist of a plurality of plates made up of the usual lead grids with a mixture of red lead and litharge pasted thereon. The bands may be applied either before or after the forming operation in which the pasted material on the positive plates is changed to peroxide of lead and that on the negative plates is reduced to spongy lead.

The strips may be applied in various ways. Thus the strips may be secured adjacent the upper and lower edges of the plates in parallel relation and one or more intermediate strips may be applied similarly. In securing the strips openings of size equivalent to the diameter of the strips are made in the lead grids and the ends of the strips are inserted therein. A light blow upon the protruding ends on the opposite faces of the plates will serve to expand the ends so that they will be held securely in position. Obviously the ends could be cemented by a celluloid or other suitable cement. The strips on the opposite faces of the plates may be staggered or the ends may be disposed in the same openings and cemented together. A continuous strip could be threaded through the openings and secured by cementing the free ends together. Instead of arranging the strips horizontally, they could be disposed vertically near the vertical edges of the plates and intermediate strips could also be secured to the plates. Also the strips could be secured diagonally of the plates, the strips on the opposite faces of the plate extending in the same or opposite directions. Several diagonally disposed strips could be secured to each face of the plate and horizontal and vertical strips could be combined with the diagonal strips in any suitable arrangement to secure the objects of the invention. When the strips have been applied the plates are assembled in a jar with the negative and positive plates alternating and the strips preventing contact of plates of opposite polarity.

The invention is particularly desirable in connection with the use of jelly electrolytes. A suitable electrolyte for the purpose may be prepared by mixing silicate of soda 8.3° Bé. and sulfuric acid 35.2° Bé. in the proportion of one part by volume of silicate of soda to 1.7 parts by volume of sulfuric acid. Such a mixture may be poured into the battery after the plates have been assembled until it covers the plates. The mixture will quickly jell. The composition described is merely illustrative and may be varied as to proportions and ingredients, jelly electrolytes being well known in the art. With such electrolytes, which are highly desirable in many types of batteries, particularly those used in automobiles, the use of insulating strips in place of separators permits reduction of the internal resistance of the battery to a minimum. Such batteries will stand heavy overcharges and abnormally high discharging rates without the disintegration which usually accompanies such abuse of storage batteries.

As to the general advantages of the insulating strips, it will be noted that the strips may be applied to the plates before they are formed, and consequently the handling of separators and losses through breakage thereof in assembling the batteries are eliminated. Moreover, new separators are never required in batteries embodying the present invention.

Figure 2:
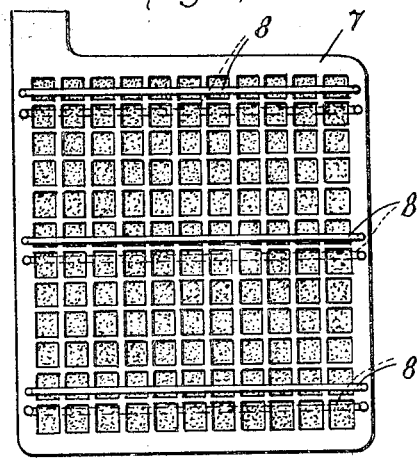
Fig. 2 is a side elevation of a battery element illustrating one mode of applying the strips thereto.
Figure 3:
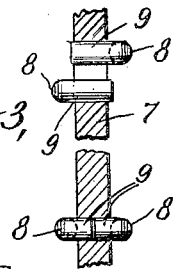
Fig. 3 is a detail in section illustrating the manner in which the strips are fastened to the battery elements.

Referring to the drawing, 5 indicates a container of suitable dimensions, the container being made of glass, vulcanized rubber or other suitable acid-resistant material. A plurality of negative plates 6 and positive plates 7 are supported within the container. The positive plates 7 preferably are provided with strips 8 of material such as celluloid as previously described. The ends 9 of the strips may be secured in suitable openings in the plate either by expanding the ends or cementing them. As indicated in Fig. 3, the strips 8 on the opposite faces of the plates may be staggered or the strips may be oppositely disposed with their ends 9 passing only partially through the plate and being cemented together at their junctions. In case an endless strip is threaded through the openings the free ends may be cemented either within one of the openings or externally of the plate. In Fig. 2 the strips are horizontally arranged and an intermediate strip between the ends of the plates is provided. If the plates are relatively large two or more intermediate strips may be employed.

Figure 4:
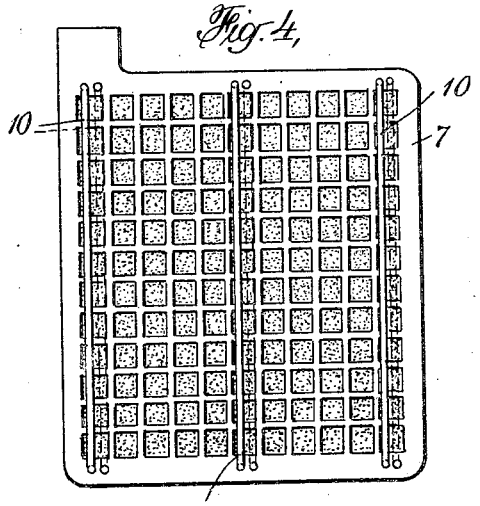
Figs. 4 and 5 are side elevations illustrating the application of the strips in different ways.
Figure 5:
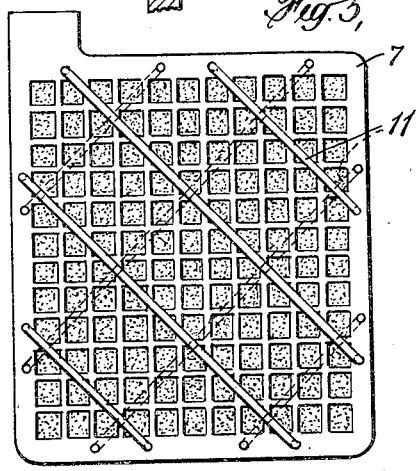

In Fig. 4 the strips 10 are vertically disposed adjacent the vertical edges of the plates. Intermediate strips may be applied if the plates are relatively large. In Fig. 5 diagonal strips 11 are applied to the opposite faces of the plates extending in the same or opposite directions and preferably in parallel relation.

The present invention is particularly marked by the simplicity of its application since ordinary stock material may be employed without waste. The application of the strips is readily accomplished and the work may be performed by relatively unskilled labor at a minimum expense. The strips insure the proper separation of the positive and negative elements of the battery without causing increased internal resistance or introducing any of the difficulties ordinarily met in the manufacture and maintenance of storage batteries.

Other advantages than those mentioned may result from the application of the invention, and various changes may be made in the details hereinbefore described without departing from the invention or sacrificing any of its advatnages.

I claim:—

A plate for storage batteries carrying active material and provided on its face with individual strips of celluloid, the ends of which are secured to the plate to serve as the sole separating means when the plate is used with other plates in a storage battery.

In testimony whereof I affix my signature.

NORMAN DEXTER STURGES.